April 9, 1946.    S. W. WILSON    2,397,996
BUTADIENE EXTRACTION
Filed Nov. 7, 1944    2 Sheets-Sheet 1

S. Winfield Wilson Inventor
By ___ Attorney

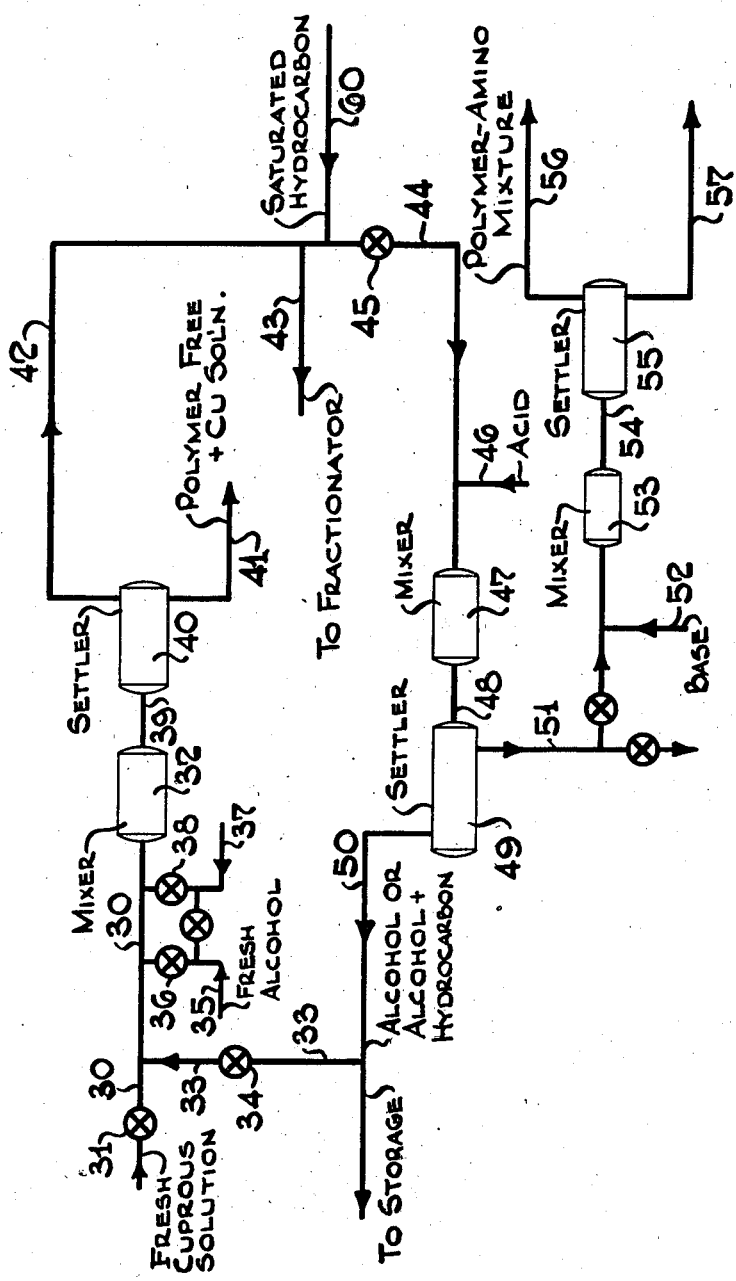

Patented Apr. 9, 1946

2,397,996

UNITED STATES PATENT OFFICE 2,397,996

BUTADIENE EXTRACTION

Samuel Winfield Wilson, Baton Rouge, La., assignor to Standard Oil Development Company, a corporation of Delaware Application November 7, 1944, Serial No. 562,279

5 Claims. (Cl. 260—681.5)

This invention relates to improvements in the extraction of diolefins and relates particularly to improvements in the separation of diolefins from mixtures of hydrocarbons containing saturated and unsaturated hydrocarbons by the use of an ammoniacal cuprous acetate solution.

Ammoniacal cuprous acetate solution of high copper content, 2 to 5 mols of copper per liter, for example a solution containing about 3.0 mols of cuprous copper, total ammonia 10.5 to 11.0 mols, acetic acid 4 mols, and the balance water and possessing a pH value of about 10.5 to 12.5 is especially effective for extracting a diolefin, of 98% purity or better, for example, butadiene, though other diolefins, such as isoprene, piperylene, and dimethylbutene, may be similarly extracted from a mixture of saturated and unsaturated hydrocarbons. The hydrocarbon mixture containing butadiene or other diolefin to be extracted is obtained by thermal cracking of oil and/or by catalytical dehydrogenation of butenes and butanes.

It has been found that the butadiene extracted with the ammoniacal cuprous acetate solution contains an undesirable viscous substance that has an ammoniacal odor and even though it is washed with water a substantial quantity of this hydrocarbon substance remains in solution. This viscous substance if allowed to remain in the separated butadiene acts as a poison in synthetic rubber production. It has been found that even lean ammoniacal cuprous acetate solution that has not been used in the extraction of diolefins contains in solution a similar viscous substance which is insoluble in water and petroleum ether and is only slightly soluble in ether or kerosene. It remains in solution in the lean ammoniacal cuprous acetate solution and contaminates the butadiene that is extracted and separated by the well-known method of absorption, stripping, desorption, and washing. This material may be classed as a mixture of amines and of polymeric substances. Amines were found to be present in an ether extract obtained from ammoniacal cuprous acetate solution to the extent of 0.3%. The more viscous or polymeric substances were removed from the lean ammoniacal cuprous acetate solution by treatment with a solvent and were found to be present to the extent of 0.06%. The same amino-compounds found in the first investigation were present to the extent of approximately 0.04% in fresh copper solution, showing that they existed as an impurity inherent in the cuprous solution.

An object of this invention is to obtain a butadiene substantially free of poisons comprising amino- and polymeric compounds.

Another object of this invention is to purify the ammoniacal cuprous acetate solution that is used in the extraction of butadiene from a mixture of saturated and unsaturated hydrocarbons.

According to this invention it has been found that these amino and polymeric substances are soluble in alcohols having at least five carbon atoms per molecule, and according to this process the amino- and polymeric bodies are removed from fresh ammoniacal cuprous acetate solution by treatment with the higher alcohols such as amyl alcohol, after which the ammoniacal cuprous acetate solution may be used in the extraction of butadiene. The amyl alcohol solution of the polymeric bodies may be distilled to recover the alcohol or may be scrubbed with acid and base. A saturated hydrocarbon having at least 5 carbon atoms per molecule being added during this washing procedure if desired.

For example a solution of ammoniacal cuprous acetate solution having a pH value of about 10.5 to 12.5 containing about 3.0 mols of cuprous copper, 10.5 to 11.0 mols of total ammonia, 4 mols of acetic acid and the balance water is washed with amyl alcohol. The washed ammoniacal cuprous acetate solution is then contacted with a mixture of hydrocarbons containing butadiene. The ammoniacal cuprous acetate solution separates and with absorbed butadiene is stripped with a portion of recycled butadiene to remove the butenes from solution. The residual ammoniacal cuprous acetate solution is then heated to desorb the butadiene which is washed with water to remove ammonia. The butadiene thereby obtained is of at least 98% purity and does not contain the amino and polymeric substances that act as poisons when the butadiene is used in synthetic rubber production.

The invention will be more clearly understood by reading the following description with reference to the accompanying drawings in which:

Fig. 2 shows an alternate flow plan of another method that may be used according to this process.

Figure 1:
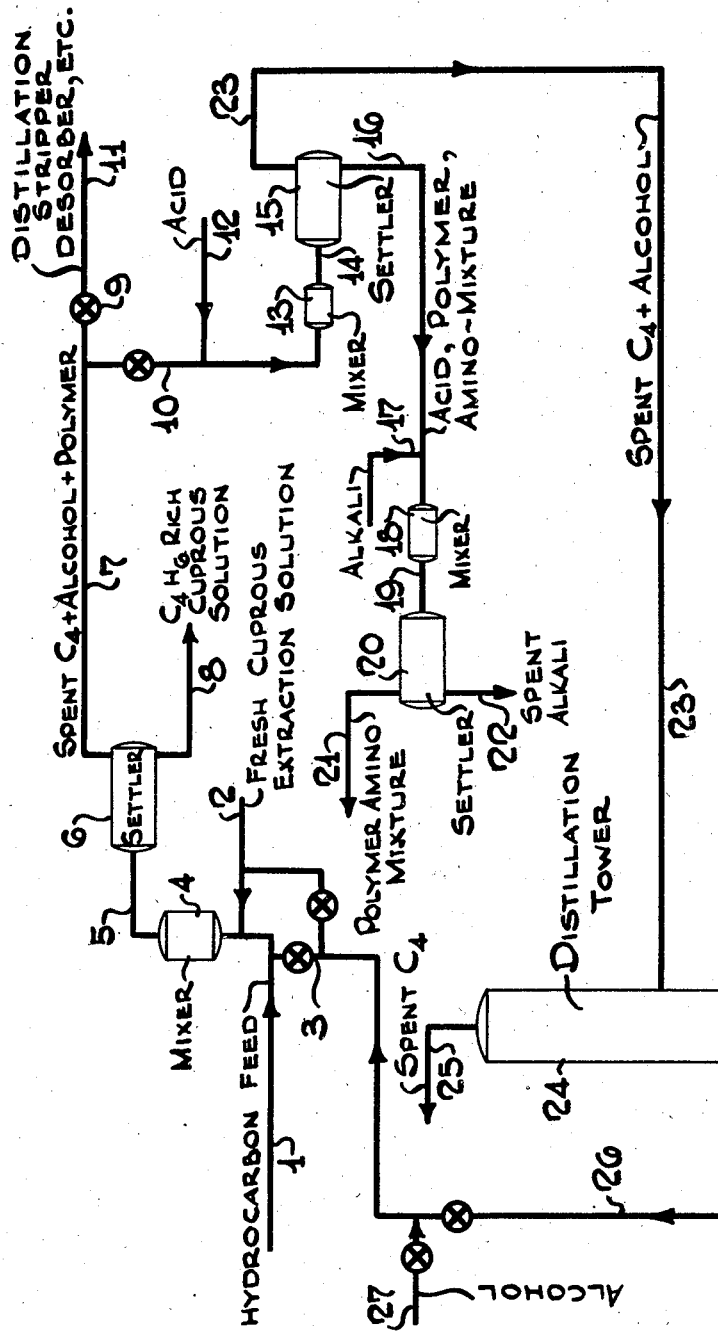
Fig. 1 shows a flow plan of one method that may be used.

Referring to Fig. 1, numeral 1 designates a pipe through which a mixture of hydrocarbons containing butadiene is passed. An ammoniacal cuprous acetate solution containing about 3 mols of cuprous copper, 10½ to 11 mols of total ammonia, 4 mols of acetic acid and the balance water is passed through pipe 2 into pipe 1. Into pipe 1 is also passed by means of line 27 and pipe 3 amyl alcohol or an alcohol having a higher number of carbon atoms to the molecule. The mixture of hydrocarbons, ammoniacal cuprous acetate solution and amyl alcohol is then passed through pipe 1 into mixer 4 where an intimate contact of the ingredients is obtained. The mixture is passed through pipe 5 to settler 6 where the solution is allowed to settle and layer separation is obtained. The upper layer consisting of unreacted hydrocarbons, alcohol and polymer is removed by means of pipe 7. A lower layer consisting of ammoniacal cuprous acetate solution with butenes and butadiene in solution is removed by means of pipe 8 to a stripping column (not shown) where absorbed butene is first removed and then to desorber (not shown) where substantially pure butadiene is obtained. The mixture of spent unreacted hydrocarbons, alcohol, and polymer may then be passed by means of pipe 11 provided with valve 9 to a distillation column where the mixture is fractionated, or the mixture may be passed through pipe 10 provided with valve to an acid scrubber, acid being introduced into pipe 10 through pipe 12. The acid used is an aqueous solution of an inorganic acid and may be, for example, dilute sulfuric or hydrochloric acid. A corrosion inhibitor is added to the dilute inorganic acid. The mixture of acid, alcohol, unreacted hydrocarbons, amino and polymeric compounds is then passed through mixer 13 and by means of pipe 14 into settler 15. From the lower part of settler 15 is removed by means of pipe 16 an acid polymer amino mixture to which is added alkali by means of pipe 17 and as it passes through mixer 18 where an intimate contact between the alkali and amino mixture is obtained. The mixture is then passed through pipe 19 into settler 20, allowed to settle and polymer amino mixture is removed overhead by means of pipe 21 and the spent alkali is removed by means of pipe 22 from the lower part. The unreacted hydrocarbons and alcohol are removed from settler 15 by means of pipe 23 and passed to a distillation tower 24 from which the unreacted hydrocarbons are removed overhead by means of pipe 25 and substantially pure alcohol obtained as a residue at the bottom of the tower and removed by means of pipe 26, which may then be recycled to pipe 3 and pipe 1, and additional alcohol may be added by means of pipe 27.

Referring to Fig. 2, a lean ammoniacal cuprous acetate solution which has been used previously in the process is passed by means of pipe 30 provided with valve 31 to a mixer 32. Into pipe 30 is added by means of pipe 33 provided with valve 34 amyl alcohol or a higher alcohol which is recycled to the process, but fresh alcohol may be added by means of pipe 35 provided with valve 36. The mixture of alcohol and lean ammoniacal cuprous acetate solution passes through mixer 32 and then by means of pipe 39 into settler 40 in which a layer separation is obtained and a polymer-free lean solution is recovered by means of pipe 41. The mixture of alcohol and the polymers is recovered through pipe 42 and is passed to a fractionating tower (not shown) by means of pipe 43 to recover the solvent alcohol which may be recycled to line 30.

I have found that washing with acid may be employed instead of the distillation procedure to resolve the mixture in line 42 into alcohol, polymers, and amine. However, I have found that a saturated hydrocarbon having more than five carbon atoms per molecule increases the efficiency of the acid washing step. This hydrocarbon may be introduced into line 30 through pipe 37 provided with valve 38 or it may be added with the fresh alcohol solvent and introduced into line 36. If the hydrocarbon has not entered the system via line 30, it may be introduced into line 44 through line 60. The mixture of alcohol, polymers, amines, and hydrocarbon is passed to an acid scrubber by means of pipe 44 provided with valve 45, the acid being added by means of pipe 46, and the mixture of alcohol, polymers, amines, hydrocarbon and acid is then passed through mixer 47 and pipe 48 into settler 49. An upper layer containing alcohol and hydrocarbon is obtained, and this phase is recycled by means of pipe 50 to pipe 33 or passed to a storage drum (not shown). The aqueous polymer-amino-acid liquid forming the bottom layer in settler 49 is passed by means of pipe 51 to a sewer; or it may be mixed with a suitable base provided by means of pipe 52 and passed through mixer 53 and pipe 54 to settler 55 where a layer separation is obtained and the polymer-amino mixture is recovered from the upper portion by means of pipe 56. From the lower portion of settler 55, the aqueous alkaline solution is passed to a sewer by means of pipe 57.

Alternate methods may be employed to recover the alcohol solvent used in this procedure, and numerous modifications of this invention will occur to those skilled in the art. I am not to be restricted to these illustrations by which the amino- and polymeric-compounds are recovered from the mixture of the ammoniacal cuprous acetate solution and the hydrocarbons that are to be obtained in a pure state, or from ammoniacal cuprous acetate solution which is freshly prepared or which has been recovered in a previous extraction process. Changes and modifications may be made within the scope of my invention.

I claim:

1. An improvement in the process of extracting butadiene from a mixture of saturated and unsaturated hydrocarbons with ammoniacal cuprous acetate solution which comprises contacting the ammoniacal cuprous acetate solution with a higher alcohol containing at least 5 carbon atoms per molecule, separating the ammoniacal cuprous acetate solution from the said alcohol, contacting the separated ammoniacal cuprous acetate solution with a mixture of saturated and unsaturated hydrocarbons containing butadiene, stripping the ammoniacal cuprous acetate solution containing butadiene to remove olefins, heating the ammoniacal cuprous acetate solution to obtain butadiene, and washing the butadiene with water.

2. An improvement in the process of extracting butadiene from a mixture of saturated and unsaturated hydrocarbons with ammoniacal cuprous acetate solution which comprises contacting the ammoniacal cuprous acetate solution with an amyl alcohol, separating the ammoniacal cuprous acetate solution from the said alcohol, contacting the separated ammoniacal cuprous acetate solution with a mixture of saturated and unsaturated hydrocarbons containing butadiene, stripping the ammoniacal cuprous acetate solution containing butadiene to remove olefins, further heating the ammoniacal cuprous acetate solution to obtain butadiene, washing the butadiene with water.

3. An improvement in the process of extracting butadiene from a mixture of saturated and unsaturated hydrocarbons with a solution of ammoniacal cuprous acetate having a copper content of 2 to 5 mols of copper per liter, which comprises contacting the ammoniacal cuprous acetate solution with a higher alcohol containing at least 5 carbon atoms per molecule, separating the ammoniacal cuprous acetate solution from the said higher alcohol and contacting the separated ammoniacal cuprous acetate solution with a mixture of saturated and unsaturated hydrocarbons containing butadiene, stripping the ammoniacal cuprous acetate solution containing butadiene to remove olefins, heating the ammoniacal cuprous acetate solution to obtain butadiene and washing the butadiene with water.

4. An improvement in the process of extracting butadiene from a mixture of saturated and unsaturated hydrocarbons with a solution of ammoniacal cuprous acetate having a copper content of 2 to 5 mols of copper per liter, which comprises contacting the ammoniacal cuprous acetate solution with a higher alcohol containing at least 5 carbon atoms per molecule and a hydrocarbon petroleum oil, separating the ammoniacal cuprous acetate solution from the higher alcohol and the petroleum oil, contacting the separated ammoniacal cuprous acetate solution with a mixture of saturated and unsaturated hydrocarbons containing butadiene, stripping the ammoniacal cuprous acetate solution containing butadiene to remove olefins, heating the ammoniacal cuprous acetate solution to obtain butadiene and washing the butadiene with water.

5. An improvement in the process of extracting butadiene from a mixture of saturated and unsaturated hydrocarbons with a solution of ammoniacal cuprous acetate having a copper content of 2 to 5 mols per liter, which comprises contacting a solution of ammoniacal cuprous acetate having a pH value of about 10.5–12.5 and containing about 3 mols of cuprous copper, 8.0–11 mols of total ammonia, 4 mols of acetic acid, and the balance water, amyl alcohol and a petroleum oil with a mixture of saturated and unsaturated hydrocarbons containing butadiene, separating the ammoniacal cuprous acetate solution from the amyl alcohol, petroleum oil and unabsorbed hydrocarbons, stripping the ammoniacal cuprous acetate solution to remove olefins, heating the ammoniacal cuprous acetate solution to obtain butadiene and washing the butadiene with water.

S. WINFIELD WILSON.